UNITED STATES PATENT OFFICE.

FRANK ROGERSON, OF STREATHAM, ENGLAND, ASSIGNOR TO OZONAIR LIMITED, OF LONDON, ENGLAND.

ART OF BREWING BEER AND OTHER LIQUORS.

976,602.  Specification of Letters Patent.  Patented Nov. 22, 1910.

No Drawing.  Application filed August 5, 1907.  Serial No. 387,141.

*To all whom it may concern:*

Be it known that I, FRANK ROGERSON, a subject of the King of Great Britain, and resident of Wood Lodge, Valley Road, Streatham, Surrey, England, brewer, have invented certain new and useful Improvements in the Art of Brewing Beer and other Liquors, of which the following is a specification.

This invention relates to an improvement in the art of brewing beer although it is of general application to cognate processes wherein fermentative action plays an essential part in the production of the article to which any such process is directed.

The invention has for its object to avoid the liability of the yeast becoming weak, or of being otherwise deleteriously affected by atmospheric influences during the fermenting process or when subsequently stored, and to enable a uniform and sound article to be produced the whole year round.

It is well known that in any process in which yeast or other ferments are employed it is desirable to purify and sterilize the air admitted to the vessels containing the fermenting liquid so as to avoid contamination of the yeast by micro-organisms present in the atmosphere. Such contamination is a frequent source of trouble in breweries and is capable of stultifying any system of pure yeast culture such as that advocated by Hansen and others for the production of beer of uniform quality and character by the employment of yeast produced from a single cell.

According to this invention access of atmospheric impurities to the wort during fermentation (as well as to the yeast during its storage), is prevented by means of surface contact with an atmosphere of purified ozonized air supplied by means of apparatus capable of producing filtered and ozonized air free from nitrogen compounds.

The air may be supplied to the fermenting tuns (or other vessels whose contents it is desired to protect from contamination) through conduits connecting the ozonizing apparatus with said vessels which are either closed in, so as to preclude access of the ambient atmosphere, or are arranged within an inclosed space into which air supplied exclusively from the ozonizing apparatus is introduced. In the latter case either open or closed vessels may be employed, the vessels when closed being provided with inlet and outlet orifices allowing of the admission to and circulation of the ozonized air within them. The purified and ozonized air may be forced into the space inclosing the vessels (or into the vessels themselves) and drawn off in a continuous stream, or may merely be fed to the space or vessels and allowed to remain therein as long as may be necessary. The supply of this purified and ozonized air is of particular utility in the case of the coolers and refrigerators for the reason that the wort is then especially open to aerobiotic attack owing to the fact that it is in a warm condition and passes over the cooler and refrigerator in a thin layer exposing a relatively large surface to the air.

The purified and ozonized air employed as above has, in addition to its protective faculty, a remarkable stimulating effect on the yeast, and is thus of especial value during hot seasons as high temperatures tend to lower the vitality of the organism or render its action sluggish.

I am aware that it has been heretofore proposed to blow ozonized air through a liquid in fermentation processes, but this is materially different from my process, according to which the wort is fermented in surface contact only with ozonized air by means of yeast which has been stored in surface contact with ozonized air.

Having now particularly described and ascertained the nature of the said invention and in what manner the same is to be performed, I declare that what I claim is:—

1. In the art of brewing beer or other liquors, the process of purifying and ozonizing wort by bringing an atmosphere of sterilized ozonized air into surface contact only with the wort during fermentation.

2. In the art of brewing beer or other liquors, the process which consists of fermenting a wort in surface contact only with ozonized air by means of yeast which has been stored in surface contact with ozonized air.

Dated 18th July 1907.

FRANK ROGERSON.

Witnesses:
 FRANK C. RYDE,
 WILLIAM G. E. DAVIES.